Patented Aug. 3, 1954

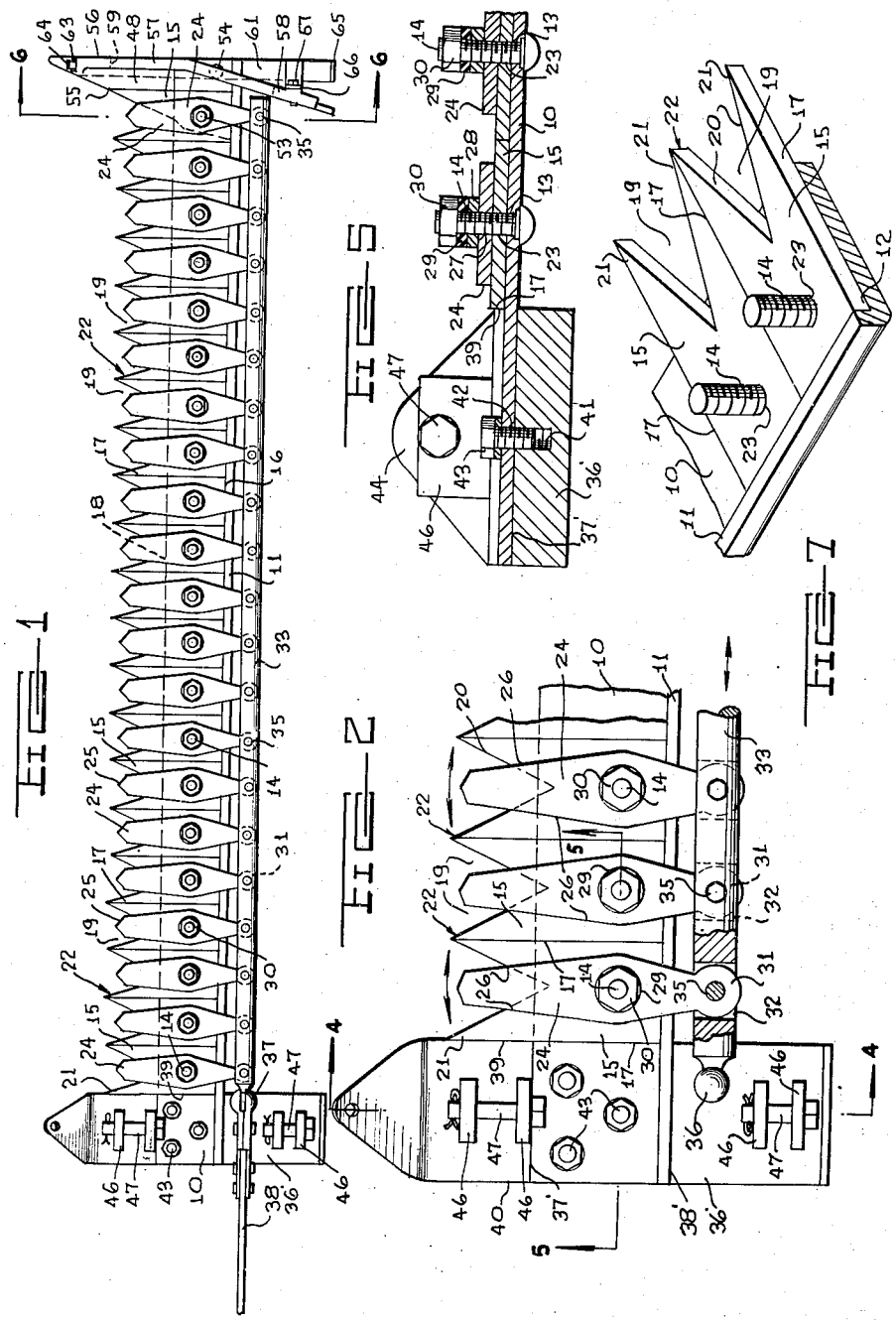

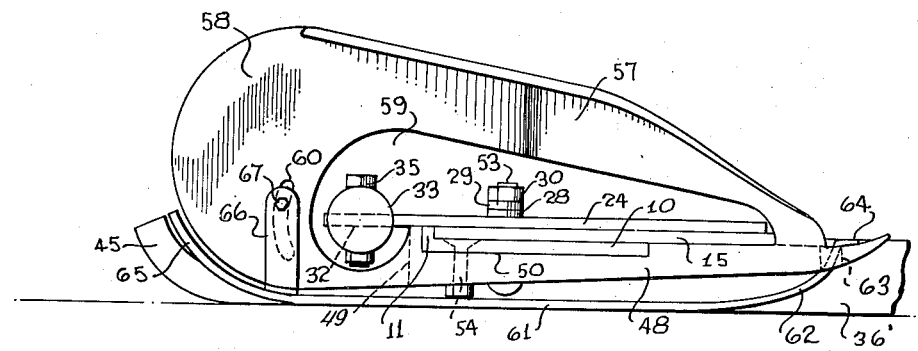
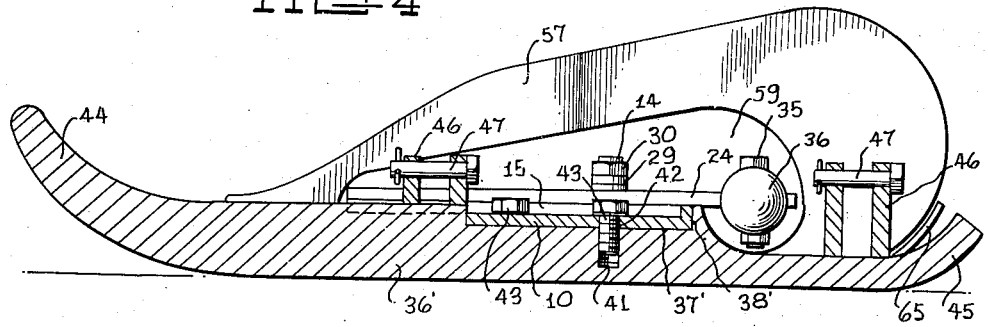
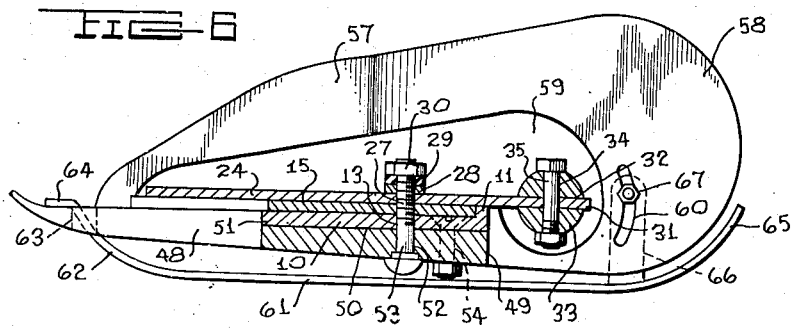

2,685,162

UNITED STATES PATENT OFFICE 2,685,162

CUTTER BAR CONSTRUCTION

Paul A. Head, Stuart, Nebr.

Application April 28, 1950, Serial No. 158,789

2 Claims. (Cl. 56—293)

My invention relates to improvements in cutter bars for mowers.

A primary object of the invention is to provide highly simplified, compact and efficient cutting apparatus for grass mowers and the like, such apparatus being extremely sturdy and long lasting in construction, and relatively inexpensive to manufacture.

A further important object of the invention is to provide a cutter bar for mowers including a novel arrangement of separate reversible cutter plates and companion, reversible, oscillating knives or blades for coaction with the cutter plates, the cutter plates and knives being assembled on the cutter bar in a compact and novel manner.

A further object is to provide mower cutting apparatus which is substantially self sharpening, and designed so as to be long lasting even when subjected to constant and heavy duty use.

Other objects and advantages of the invention will be apparent during the course of the following description.

In the accompanying drawings forming a part of this application, and in which like numerals are employed to designate like parts throughout the same:

Figure 1 is a plan view of a mower cutter bar embodying my invention;

Figure 2 is an enlarged, fragmentary plan view of one end of the cutter bar, partly in section;

Figure 3 is an elevational view of the right end of the cutter bar illustrated in Figure 1;

Figure 4 is an enlarged, transverse, vertical, sectional view taken on line 4—4 of Figure 2;

Figure 5 is an enlarged, fragmentary, vertical, sectional view taken on line 5—5 of Figure 2;

Figure 6 is an enlarged, transverse, vertical, sectional view taken on line 6—6 of Figure 1; and Figure 7 is an enlarged, fragmentary, perspective view of a support bar and stationary cutter plates carried thereby.

In the drawings, where, for the purpose of illustration, is shown a preferred embodiment of my invention, the numeral 10 designates an elongated support or sickle bar provided at one longitudinal side edge with an upwardly extending flange 11. The flange 11 projects a slight distance only above the flat top face of the support or sickle bar and forms therewith a sharp, square corner 12. The support or sickle bar 10 is provided substantially midway between opposite side edges with a longitudinal row of longitudinally equidistantly spaced openings 13 for receiving a plurality of upwardly directed bolts 14 which project a substantial distance above the top face of the bar 10, as shown.

A plurality of relatively thin, flat, stationary ledger blades or cutter plates 15 are mounted upon the top of the support plate 10 in side-by-side, contacting relation, Figures 1 and 7. These stationary cutter plates 15 are rigid and generally rectangular. The cutter plates 15 have straight, rear ends or edges 16 which are perpendicular to the top and bottom flat faces of the cutter plates, and the rear edges 16 engage the flange 11 of the support or sickle bar 10, the rear ends of the support plates 15 fitting snugly within the square corner 12. The side longitudinal edges 17 of the stationary cutter plates 15 are perpendicular to the rear edges 16 and flange 11, and the cutter plates 15 extend transversely beyond the longitudinal edge 18 of the support bar 10 remote from the flange 11. The ledger blades or cutter plates 15 are provided in their forward ends with large symmetrical, V-shaped openings or recesses 19, the rearwardly converging side edges 20 of which are perpendicular to the top and bottom flat faces of the cutter plates 15. The arrangement is such that the stationary cutter plates 15 terminate at their forward ends in laterally spaced, forwardly directed, sharp, pointed portions or prongs 21 formed by adjacent pairs of edges 17 and 20. Thus, the rearwardly converging side edges 20 of the recesses 19 constitute cutting edges on the plates 15. In the assembled cutter bar, adjacent pairs of the pointed portions or prongs 21 of the contacting plates 15 constitute longitudinally equidistantly spaced, forwardly directed, V-shaped fingers or guides 22 between each adjacent pair of V-shaped openings 19. The engagement of the rear edges 16 with the upturned flange 11 prevents the stationary cutter plates 15 from turning on the support bar 10 in assembly. The cutter plates 15 are provided with substantially central apertures 23 which register in assembly with the openings 13 of the support bar 10 and receive the bolts 14, as shown. The assembled cutter plates 15 cover substantially the entire length of the support bar 10, Figure 1, but the support bar extends a slight distance beyond the opposite ends of the group of cutter plates 15.

Slidably mounted upon the stationary cutter plates or ledger blades 15 for oscillation and arranged at the transverse centers of the stationary cutter plates are a plurality of separate, elongated, flat shear blades or knives 24 extending throughout substantially the entire lengths of the cutter plates 15 and longitudinally rearwardly of the rear transverse edges 16 thereof. As shown best in Figure 6, the flat top faces of the stationary cutter plates 15 are flush with the top of the upturned flange 11, so that the rear ends of the oscillating knives 24 extend slidably across the top of the flange 11, Figures 2 and 6. The oscillating knives 24 are somewhat narrower than the plates 15, Figure 2, and the knives 24 taper longitudinally from points near their longitudinal centers toward their forward and rear ends. The forward ends 25 of the shear blades 24 preferably terminate a slight distance to the rear of the points of the fingers 22, as shown. The forwardly converging side edges 26 of the shear blades, which constitute cutting edges, lie perpendicular to the top and bottom faces thereof to define sharp shearing edges adjacent the ledger blades 15. When the knives 24 are arranged parallel with the plates 15, their forward portions extend over the V-shaped openings 19 and are centered with respect to such openings. The edges 26 of the knives 24 cross the edges 20 of the stationary cutter plates 15, Figure 2, so that shearing may take place between the knives and stationary cutter plates when the knives oscillate. The knives 24 are provided with substantially central apertures 27 which register in assembly with the apertures 23 and receive the bolts 14 therein. Flat washers 28 are mounted upon the bolts 14 above the knives 24, and resilient washers 29 of rubber or the like in turn are mounted upon the bolts 14 above the washers 28. Nuts 30 are secured to the top ends of the bolts 14 above the resilient washers 29, as shown, and the washers 29 serve to resiliently tension the oscillating knives 24 against the stationary cutter plates 15 when the nuts 30 are tightened. Like the stationary cutter plates 15, the oscillating knives 24 are substantially rigid. Since the knives 24 and stationary cutter plates 15 are perfectly flat, and since the cutting edges 20 and 26 are perpendicular to the flat faces of the knives and stationary cutter plates, both the knives and cutter plates may be turned over or reversed on the support plate 10, in order to prolong their useful life. Further, since the cutting edges 20 and 26 are perpendicular to the flat faces of the plates 15 and knives 24 on which said cutting edges are respectively formed, the oscillating knives and stationary cutter plates tend to be self sharpening. Whenever any one of the knives 24 or plates 15 is bent or otherwise damaged, it is readily bodily removable and replaceable without disturbing the remaining knives and cutter plates of the assembly. The arrangement of the knives 24 and stationary cutter plates 15 upon the support bar 10 is highly compact and extremely sturdy and durable. The upturned flange 11 prevents the assembled group of plates 15 from turning about the bolts 14, and materially stiffens the support bar 10.

The knives 24 are provided at their rear ends and rearwardly of the flange 11 with round, flat, apertured heads 31, slidably engaging in narrow, transverse slots 32 formed in an elongated, straight push or cutter bar 33 which extends longitudinally adjacent to the rear edge of the support bar 10 and throughout substantially its entire length, Figure 1. The push bar 33 is spaced laterally rearwardly of the bar 10 a slight distance, as shown. The push bar 33 is provided at the centers of the slots 32 with transverse openings 34 which intersect the slots and extend perpendicular thereto. The slots 32 and openings 34 are equidistantly spaced longitudinally along the push bar 33 so as to accommodate the equidistantly spaced heads 31 of the knives 24. Pivot bolts 35 extend through the openings 34 of the push bar and apertured heads 31 for detachably pivotally connecting the push bar and knives 24. The push bar 33 is preferably provided at one end with a spherical head or ball 36 integral therewith, and this ball 36 has swivel connection, as at 37, Figure 1, with the usual rod or pitman 38 actuated by mower mechanism, not shown. The arrangement is such that when the pitman 38 reciprocates the push bar 33, the knives 24 will swing or oscillate in unison over the stationary cutter plates 15 for shearing the grass between the edges 20 and 26 at both sides of the V-shaped openings or recesses 19. As the mower travels forwardly, the V-shaped points or guides 22 tend to direct or guide the grass between the adjacent cutting edges 20 and 26.

An inner, generally flat, elongated, ground-engaging plate or shoe 36' is arranged adjacent to and beneath the end of the support bar 10 nearest the ball 36, Figure 2. This shoe 36' extends transversely of the support bar 10 and forwardly and rearwardly of the same for substantial distances, as shown. The shoe 36' is provided in its top face and near its longitudinal center with a shallow, transverse recess or groove 37' within which is seated the adjacent end of the support bar 10. The groove 37' is deep enough to accommodate the upturned flange 11, Figure 4, and the top face of the shoe 36' is flush with the top of the flange 11. The bottom of the groove 37' is flat, and its rear, transverse edge 38' is parallel to the flange 11 and perpendicular to the bottom of the groove 37' for forming a sharp corner. With this arrangement, when the end of the support bar 10 is seated within the groove 37', the shoe 36' cannot turn relative to the support plate. The first or endmost stationary cutter plate 15 adjacent to the shoe 36' engages or abuts the inner longitudinal edge 39 of the shoe 36', the top faces of the plates 15 being substantially flush with the top face of the shoe 36', due to the arrangement of the support bar 10 in the groove 37', Figure 4.

As shown in Figures 1 and 2, the outer longitudinal edge 40 of the shoe 36' is flush with the adjacent end of the support bar 10. The shoe 36' is provided in its top face with a plurality of spaced, screw-threaded openings 41 which register in assembly with correspondingly spaced apertures 42 in the adjacent end portion of the bar 10. Cap screws 43 or the like serve to detachably secure the shoe 36' to the bottom of the support bar 10. The shoe 36' is preferably upturned and tapered at its forward end, as shown at 44, and the rear end of the shoe is likewise preferably upturned, as at 45. The shoe 36' is provided forwardly and rearwardly of the bar 10 with pairs of spaced upstanding, aperturned lugs 46 integral therewith, and the lugs 46 carry horizontal pivot pins 47, which are spaced above the top of the shoe 36'. The pivot pins 47 are preferably located at the transverse center of the shoe 36' and extend longitudinally of the shoe. The pins 47 serve to detachably and piovtally secure the cutter bar to the rest of the mower, not shown, so that the cutter bar may be raised and lowered to and from its operative position in the usual manner.

An outer plate or shoe 48 is arranged adjacent to and beneath the other end of the support bar 10 remote from the shoe 36'. The shoe 48 is elongated and extends transversely of the support bar 10 and forwardly thereof, as shown. As shown in Figure 6, the rear transverse edge 49 of the plate or shoe 48 is arranged flush with the rear longitudinal edge of the support bar 10. The shoe 48 is sustantially flat and trangular in shape, and the shoe is provided in its top, horizontal face and rear edge 49 with a shallow, flat recess 50 forming a forward square transverse edge or shoulder 51 for engagement by the forward longitudinal edge of the bar 10. The adjacent end portion of the bar 10 is seated within the recess 50, and the top face of the bar 10 is flush with the top face of the shoe 48. The upturned flange 11 projects above the flat top face of the shoe 48, Figure 6 and the adjacent outermost or end cutter plate 15 has its bottom face engaging the top face of the shoe 48. As shown in Figure 1, the triangularly-shaped shoe 48 extends beneath the adjacent endmost cutter plate 15, and the shoe 48 is provided near its inner or left-hand edge, Figure 1, with an aperture 52 which registers with the adjacent endmost opening 13 of the bar 10 and the apertures 23 and 27 of the adjacent endmost plate 15 and knife 24 in assembly. An upwardly directed bolt 53, somewhat longer than the bolts 14, extends through the registering apertures 52, 13, 23 and 27, Figure 6, and a pair of the washers 28 and 29 and one of the nuts 30 are mounted upon the top end of the bolt 53 above the endmost knife 24. The bolt 53 thus serves not only to connect the adjacent endmost knife 24 and plate 15 to the bar 10, but also to detachably secure the bar 10 to the plate or shoe 48. An additional downwardly directed screw or bolt 54 is spaced diagonally from the bolt 53 and has its flat head countersunk in the support bar or plate 10, Figure 6. This bolt 54 extends through registering openings in the support bar 10 and shoe 48, and serves with the bolt 53 to detachably secure the shoe 48 to the bottom of the bar 10.

As shown in Figure 1, the triangular shoe 48 has its pointed end or apex directed forwardly, and the inner inclined or diagonal edge 55 of the shoe 48 serves to guide grass or the like into the adjacent endmost V-shaped opening 19 of the endmost cutter plate 15. The outer longitudinal edge 56 of the shoe 48 is straight and perpendicular to the support bar 10, so that the mower cutter bar may cut the grass close to walls, steps, curbs and the like.

Adjacent to its outer longitudinal edge 56, the shoe 48 is provided with an integral, upstanding, vertical flange 57 which extends for the entire length of the shoe 48 and longitudinally rearwardly of the rear transverse edge 49 of the shoe, as shown. Rearwardly of the edge 49, the flange 57 is diagonally inwardly directed, as at 58, and the rear end of the flange terminates a substantial distance rearwardly of the push bar 33, Figure 1. The flange 57 is preferably provided with a large opening 59 extending throughout the major portion of its length for receiving the adjacent end of the support bar 10, Figure 1, and the end of the push bar 33, when such bar is shifted towards the flange 57 by the pitman 38. Near its rear end, the diagonal portion 58 of the flange 57 is provided with a generally vertical, elongated, arcuate slot 60 adjacent to the push bar 33, Figure 6. A narrow, elongated, generally flat, ground-engaging runner or shoe 61 extends below and longitudinally of the shoe 48 and adjacent to the outer longitudinal edge 56. The shoe 61 has its forward end upwardly directed and curved, as at 62, and the forward end of the shoe 61 extends through a small opening 63 formed near the forward end of the shoe 48. The forward end of the shoe 61 is bent for forming a short, horizontal tab or locking tongue 64 engaging the top of the shoe 48 forwardly of the opening 63. The rear end of the shoe 61 is adjustable vertically, and the opening 63 is large enough to permit the forward portion of the shoe 61 to pivot therein, so that the angle of the shoe 61 may be changed when its rear end is raised and lowered. The rear end 65 of the shoe or runner 61 is upwardly directed and curved, Figure 3, and the shoe 61 is provided near and forwardly of its rear end with an integral, upstanding, apertured ear or extension 66 which lies adjacent to the outer face of the diagonal flange portion 58. An adjusting bolt 67 or the like extends through the arcuate slot 60 and apertured extension 66 for releasably securing the shoe 61 in the selected adjusted position. When the bolt 67 is loosened, the rear end of the runner or shoe 61 may be readily raised and lowered for varying the elevation of the outer end of the cutter bar of the mower. The runner 61 is normally spaced from the bottom of the shoe 48 a slight distance, even when the bolt 67 is at the top of the slot 60. The runner or shoe 61 is substantially horizontal when its rear end is in the uppermost or raised position, as shown.

It is to be understood that the form of the invention herewith shown and described is to be taken as a preferred example of the same, and that various changes in shape, size and arrangement of parts may be resorted to without departing from the spirit of the invention or the scope of the subjoined claims.

Having thus described my invention, I claim:

1. In a mower a sickle bar, a cutter bar carried by the sickle bar for reciprocation adjacent one side edge thereof, said cutter bar having longitudinally spaced openings extending transversely therethrough, juxtaposed ledger blades removably carried by the sickle bar and extending laterally therefrom on the side thereof remote from the cutter bar, said ledger blades having V-shaped openings extending thereinto through the ends thereof remote from the cutter bar and defining pointed fingers which project laterally from the sickle bar, shear blades removably carried by the sickle bar for oscillation across the V-shaped openings above and in contact with the ledger blades, and heads carried by the shear blades and extending into the openings in the cutter bar for oscillating the shear blades and shearing off growth entering the V-shaped openings in the ledger blades.

2. In a mower a sickle bar, a cutter bar carried by the sickle bar for reciprocation adjacent one side edge thereof, said cutter bar having longitudinally spaced openings extending transversely therethrough, a row of longitudinally spaced screw threaded studs carried by the sickle bar and projecting upwardly therefrom substantially midway between opposite side edges thereof, a flange carried by the sickle bar and extending upwardly therefrom adjacent the edge thereof adjacent the cutter bar, juxtaposed substantially rectangular ledger blades removably seated on the sickle bar in engagement with the flange, said ledger blades having stud receiving openings extending therethrough substantially midway between opposite side edges thereof and through which the studs project, said ledger blades projecting beyond the side edge of the sickle bar remote from the flange and having symmetrically disposed V-shaped openings extending thereinto through the ends thereof remote from the flange, shear blades mounted on the studs to oscillate across the V-shaped openings in contact with the top surfaces of the ledger blades, heads carried by the shear blades and extending into the openings in the cutter bar for oscillating the shear blades when the cutter bar reciprocates, and means carried by the studs and yieldingly bearing on the shear blades for holding the shear blades in contact with the ledger blades and the ledger blades on the sickle bar.

References Cited in the file of this patent

UNITED STATES PATENTS

| Number | Name | Date |
| --- | --- | --- |
| 27,826 | Paxson | Apr. 10, 1860 |
| 426,801 | Hall | Apr. 29, 1890 |
| 536,924 | Dorney | Apr. 2, 1895 |
| 1,152,322 | Knapp | Aug. 31, 1915 |
| 1,800,081 | Kishell | Apr. 7, 1931 |
| 2,051,394 | Reever | Aug. 18, 1936 |
| 2,259,750 | Johnson | Oct. 21, 1941 |